United States Patent [19]
Inoue

[11] 3,917,987
[45] Nov. 4, 1975

[54] VOICE COIL MOTOR CONTROL SYSTEM
[75] Inventor: Yuji Inoue, Musashino, Japan
[73] Assignee: Fujitsu Limited, Kawasaki, Japan
[22] Filed: Dec. 23, 1974
[21] Appl. No.: 536,871

[30] Foreign Application Priority Data
Dec. 28, 1973 Japan................................ 48-4945

[52] U.S. Cl. ................. 318/135; 310/13; 318/687
[51] Int. Cl.² .................. G05B 19/28; H02K 41/02
[58] Field of Search ...... 310/13; 318/119, 126, 127, 318/129, 687, 135

[56] References Cited
UNITED STATES PATENTS

| | | | |
|---|---|---|---|
| 3,626,267 | 12/1971 | Bobbitt .............................. | 318/686 |
| 3,737,883 | 6/1973 | Sordello et al............... | 318/687 UX |
| 3,745,386 | 7/1973 | Lloyd........................... | 310/13 |
| 3,839,664 | 10/1974 | Dirks et al. ..................... | 318/687 X |

Primary Examiner—R. M. Envall, Jr.
Attorney, Agent, or Firm—Daniel Jay Tick

[57] ABSTRACT

A voice coil motor control system includes a lower curve function generator for providing a lower distance-speed function for the motor indicating the motor acceleration stop point. An upper curve function generator provides an upper distance-speed curve function for the motor to follow and stops the motor at a desired position by following the upper distance-speed curve. The lower curve function generator and the upper curve function generator provide the lower distance-speed curve function in proportional relation with the upper distance-speed curve function.

3 Claims, 11 Drawing Figures

VOICE COIL MOTOR 1

ABSOLUTE VALUE CIRCUIT

FUNCTION GENERATOR

VOICE COIL MOTOR CONTROL SYSTEM

BACKGROUND OF THE INVENTION

The present invention relates to a voice coil motor control system. More particularly, the invention relates to a voice coil motor control system for a voice coil motor, which system utilizes an upper distance-speed curve and a lower distance-speed curve in order to stop the voice coil motor at a specified position at which the upper distance-speed curve function and the lower distance-speed curve function are in proportional relation.

The voice coil motor controlled by the system of the present invention operates on the principle that a coil placed in a magnetic field may be moved in a direction crossing the magnetic flux of the field when a current is applied to said coil, and the current has the same configuration as that of the source of vibration which vibrates the diaphragm of the usual loudspeaker.

The voice coil motor is used, for example, in a magnetic disc pack unit used as the file facility of an information processing system in order to move a magnetic head on the surface of the magnetic disc. In a magnetic disc pack unit, a magnetic head is usually placed face-to-face on one-to-one basis with a surface of a magnetic disc. The voice coil motor positions the magnetic head at each of several tracks on the surface of the disc.

When it is required that the magnetic head, which is positioned at a specific track on the magnetic disc, be moved to another track, a current depending upon the direction of movement of the head is supplied to the coil of the voice coil motor. As a result, the coil moves, and moves the magnetic head, which is coupled to the coil, toward the desired position.

Various methods have been attempted to obtain high speed movement of the magnetic head in order to provide more rapid movement than that of the known method in a magnetic disc pack unit. In a typical known system, the control is effected to operate the motor to follow a predetermined optimum curve of the distance and speed for efficient control of motor operation. The distance-speed curve is expressed as the function of speed corresponding to the distance between the actual position and the desired position of the magnetic head in order to position the magnetic head in the desired position accurately and rapidly.

In the known method, only one distance-speed curve is prepared for the speed control of the motor by comparing the curve with the actual speed of the motor. A limitation of the switching element of the switching circuit used for motor control produced no notable effect. Therefore, two types of curves are currently used. One curve is a lower distance-speed curve which indicates the stop point of acceleration of the motor. The other curve is an upper distance-speed curve to which the motor follows.

However, there are drawbacks even in the method using two types of curves. In such method, the higher the motor driving current, the shorter the allowed switching time from the relation of the two curves. It is thus attempted to provide sufficient switching time when switching a large driving current. When such attempt is made, the access time for moving the head to the desired position becomes longer when the driving current is small. Furthermore, in the known method, it is difficult to maintain the accuracy of the function generators.

The principal object of the invention is to provide a voice coil motor control system for controlling a voice coil motor to move a magnetic head with accuracy and rapidity.

An object of the invention is to provide a voice coil motor control system of simple structure, which is inexpensive in manufacture and functions efficiently, effectively and reliably to control a voice coil motor to move a magnetic head to a desired position.

Another object of the invention is to provide a voice coil motor control system which includes a function generator which functions accurately.

Still another object of the invention is to provide a voice coil motor control system utilizing two types of curves and wherein the larger the driving current, the longer the allowable switching time.

Yet another object of the invention is to provide a voice coil motor control system utilizing two types of curves and wherein the larger the driving current, the longer the allowable switching time and the function generator included in the system operates accurately.

BRIEF SUMMARY OF THE INVENTION

The voice coil motor control system of the invention comprises a lower curve function generator for providing a lower distance speed function for the motor indicating the motor acceleration stop point. An upper curve function generator provides an upper distance-speed function for the motor to follow and stops the motor at a desired position by following the upper distance-speed curve. The lower curve function generator and the upper curve function generator provided the lower distance-speed function and the upper distance-speed function in proportional relation.

In accordance with the invention, a voice coil motor control system for controlling a voice coil motor for moving an object comprises distance means for providing an output signal in accordance with the distance between the actual position of the object and the desired position of the object. Lower curve means provides a speed signal for the motor indicating the stop point of acceleration in accordance with a lower curve function of the difference means. Upper curve means provides a speed signal for the motor to follow in accordance with an upper curve function in proportional relation with the lower curve function of the lower curve means.

Control means varies the control period of the motor between the lower curve function and the upper curve function in accordance with the output signal of the distance means.

A comparator connected between the lower curve means and the upper curve means and the motor compares the speed of movement of the motor with the speed signal related to the upper curve function and the speed signal related to the lower curve function and controls the operation of the motor in accordance with the results of the comparison.

An absolute value circuit connected between the motor and the comparator provides the absolute value of the speed of movement of the motor to the comparator.

BRIEF DESCRIPTION OF THE DRAWINGS

In order that the invention may be readily carried into effect, it will not be described with reference to the accompanying drawings, wherein.

In the FIGS., the same components are identified by the same reference numerals.

DETAILED DESCRIPTION OF THE INVENTION

Figure 1:
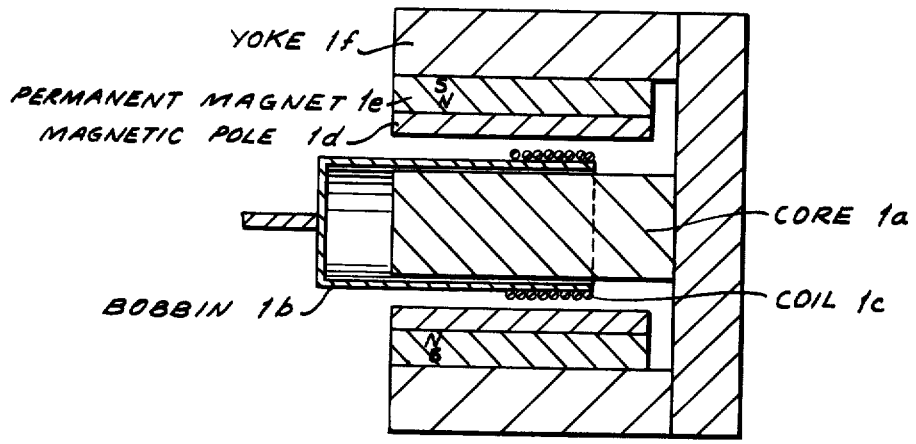
FIG. 1 is a cross-sectional view of an embodiment of a voice coil motor of the type controlled by the system of the invention.

FIG. 1 is a cross-sectional view of an embodiment of a voice coil motor of a type controlled by the voice coil motor control system of the invention. The motor 1 has a core $1a$, a bobbin $1b$, a coil $1c$, a magnetic pole $1d$, a permanent magnet $1e$ and a yoke $1f$.

The magnetic flux produced by the permanent magnet $1e$ is provided on the iron core $1a$ via the magnetic pole $1d$ and the gap. Furthermore, the magnetic flux returns to the yoke $1f$ via the magnet $1e$. The flux in the gap is interlinked with the coil $1c$ and the coil moves straight along the iron core $1a$ accordinging to the Fleming's law when current flows through the coil. The direction of movement of the coil $1c$ is determined by the direction of the current supplied to said coil.

Figure 2A:
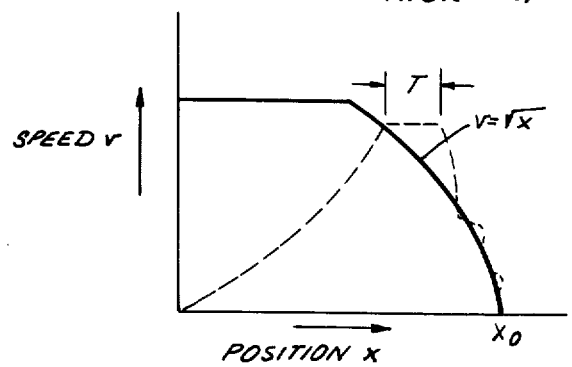
FIG. 2A is a graphical presentation of a distance-speed curve for controlling a voice coil motor.

The voice coil motor 1 of FIG. 1 moves a magnetic head of a magnetic disc pack and stops the head at a desired point $x_o$. This is accomplished by speed control of the motor by following a curve $v = \sqrt{x}$ and feeding back the speed of movement $v_r$ of the motor and the position $x$ of the magnetic head. In other words, during acceleration of the speed of the motor, as shown by the broken line in FIG. 2A, the driving current of the motor is discontinued or supplied in the reverse direction when the speed $v_r$ and the position x cross the distance-speed curve. Thus, acceleration of the motor stops and the motor decelerates. The speed control of the motor is thus effected so that the motor follows the distance-speed curve $v = \sqrt{x}$.

Figure 2B:
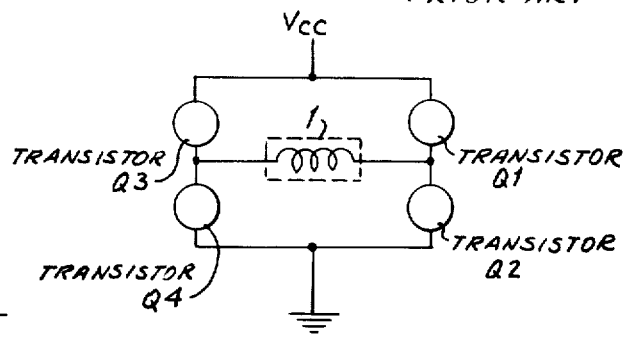
FIG. 2B is a schematic circuit diagram of an embodiment of a power supply circuit for controlling a voice coil motor.

The control circuit of FIG. 2B is generally used in the aforedescribed speed control system. FIG. 2B includes the voice coil motor 1 and a plurality of switching transistors Q1, Q2, Q3 and Q4. When the transistors Q1 and Q3 are ON, for example, the motor is accelerated in the forward direction. When the transistors Q2 and Q4 are ON, the motor is stopped. Furthermore, the transistors Q3 and Q4 are turned ON to decelerate the motor by supplying the current to the motor in the reverse direction.

In the operation of the circuit of FIG. 2B, however, it is necessary that the transistor to be turned ON be turned ON after the transistor which is already ON is turned OFF completely, in order to prevent undesired short-circuiting during the switching operation. In other words, it is necessary to secure the switching time for the switching elements. For this reason, despite the follow-up control being required in accordance with the curve of FIG. 2A, there is no control during a period T indicated by the broken line, since such control may vary considerably from the control curve $v = \sqrt{x}$.

Figure 3A:
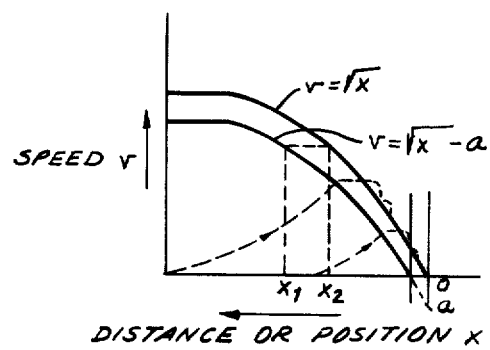
FIG. 3A is a graphical presentation of upper and lower distance-speed functions used in controlling a voice coil motor by a prior art method.

Thus in the known method, a lower curve $v = \sqrt{x} - a$ and an upper curve $v = \sqrt{x}$ are prepared as shown in FIG. 3A. In FIG. 3A, as in FIG. 2A, the abscissa represents the distance or position $x$ and the ordinate represents the speed $v$ of the motor 1. As a result, the motor is considerably accelerated, as shown by the broken lines in FIG. 3A. Furthermore, when the speed of the motor crosses the lower curve, the driving current is discontinued, so that the control follows the upper curve $v = \sqrt{x}$, as shown by the broken lines. In this case, the time T1, until the speed of the motor crosses the upper curve at the position $x_2$ on the $x$ axis after the motor accelerates and crosses the lower curve at the position $x_1$, is expressed by the following equation.

$$T1 = 2a + \sqrt{\frac{a^2}{x_1 - a}}$$

$$= 2a + \frac{a^2}{v_r} \qquad (1)$$

Figure 3B:
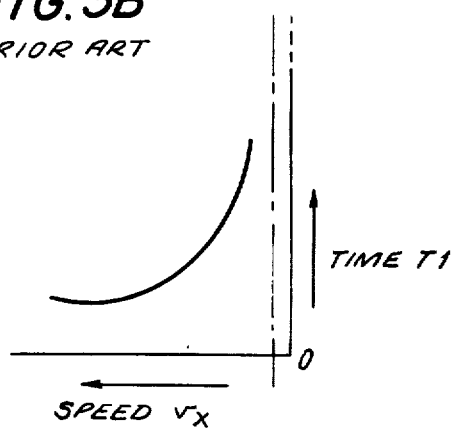
FIG. 3B is a graphical presentation of the switching time characteristic of a motor control system utilizing the curves of FIG. 3A.

The condition of Equation (1) is shown in FIG. 3B, wherein the abscissa represents the speed $v_r$ and the ordinate represents the time T1. More particularly, when the speed crosses the lower curve of FIG. 3A at a position along the $x$ axis farther from the point $o$ at which the motor must stop, the time T1 becomes proportionately short, shortening the period for the switching operation, explained with regard to FIG. 2B. However, when the speed crosses the lower curve at such a position as far from the point O, the motor driving current is considerably large, necessitating a longer period for the switching operation.

Therefore, if an attempt is made to provide sufficient switching time in case the speed crosses the lower curve $v = \sqrt{x} - a$ at a position far from the point O, the time until the speed crosses the upper curve $v = \sqrt{x}$ after crossing the lower curve is that the opposite case in which the speed crosses the lower curve at a position near the point O. As a result, the access time for the magnetic head to reach the stop position becomes longer.

Figure 4A:
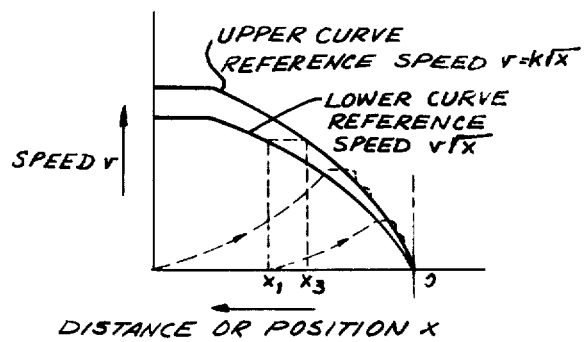
FIG. 4A is a graphical presentation of upper and lower distance-speed functions used in the voice coil motor control system of the invention to control a motor.

FIG. 4A shows the upper and lower distance-speed functions used in the voice coil motor control system of the invention for solving the aforedescribed problem. The lower curve $v = \sqrt{x}$ and the upper curve $v = k\sqrt{x}$ are functions in proportional relation. In FIG. 4A, the abscissa represents the distance or position x and the ordinate represents the speed $v$ of the motor 1. In this case, the time T2 until the speed of the motor crosses the upper curve at the position $x_3$ after crossing the lower curve at the position $x_1$ is expressed by the following equation.

$$T2 = \sqrt{x_1}\ (1 - \frac{1}{k^2})$$

$$= v_r\ (1 - \frac{1}{k^2}) \qquad (2)$$

Figure 4B:
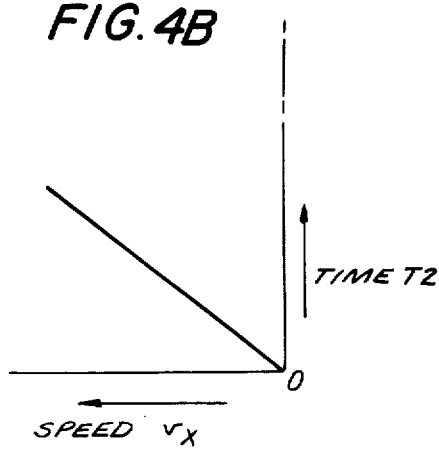
FIG. 4B is a graphical presentation of the switching time characteristic of the voice coil motor control system of the invention.

The condition of Equation (2) is shown in FIG. 4B, wherein the abscissa represents the speed $v_r$ and the ordinate represents the time T2. As shown in FIG. 4B, when the speed crosses the lower curve at a position farther from the point O, the time until it crosses the upper curve is proportionately large. In other words, switching time is easily provided even when the control circuit of FIG. 2B is used. From an overall viewpoint, the access time is short.

Figure 5:
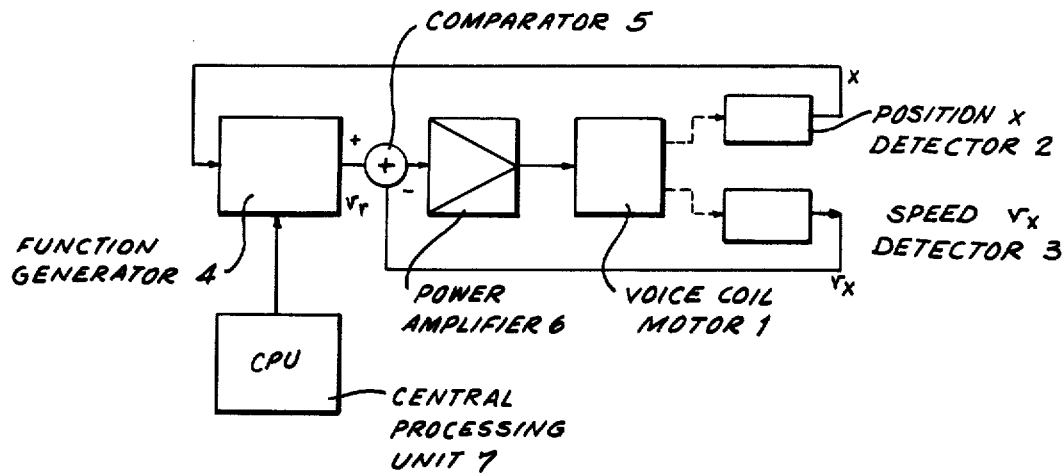
FIG. 5 is a block diagram of an embodiment of the voice coil motor control system of the invention.

FIG. 5 is a block diagram of an embodiment of the voice coil motor control system of the invention. The motor control system of FIG. 5 comprises a position $x$ detector 2 and a speed $v_x$ detector 3 of any suitable known type coupled to the voice coil motor 1. A function generator 4 has one input electrically connected to the output of the position detector 2 and another input electrically connected to a central processing unit 7 of any suitable known type. The output of the function generator 4 is electrically connected to one input of a comparator 5. Another input of the comparator 5 is electrically connected to the output of the speed detector 3. The output of the comparator 5 is electrically connected to the voice coil motor 1 via a power amplifier 6 of any suitable known type.

The magnetic head (not shown in the FIGS.) is driven by the motor 1. The position $x$ of the head on the $x$ axis, which is equivalent to the position aforedescribed as the position of the motor on the $x$ axis, for simplification, is detected as a number of cylinder pulses by the position detector 2 and is fed to the function generator 4. On the other hand, the speed of movement $v_x$ of the magnetic head, which is equivalent to the speed aforedescribed as the speed of the motor, for simplification, is detected by the speed detector 3.

The function generating circuit or function generator 4 detects the difference between the actual position of the motor and the stop position of the motor specified by the central processing unit 7 and produces a reference speed signal $v_r$ corresponding to the curves shown in FIG. 4A. The reference speed $v_r$ is compared with the actual speed $v_x$ of the motor provided by the speed detector 3 by the comparator 5. A signal proportional to the difference in speed is fed to the power amplifier 6, which controls the voice coil motor 1 in accordance with such difference.

Figure 6:
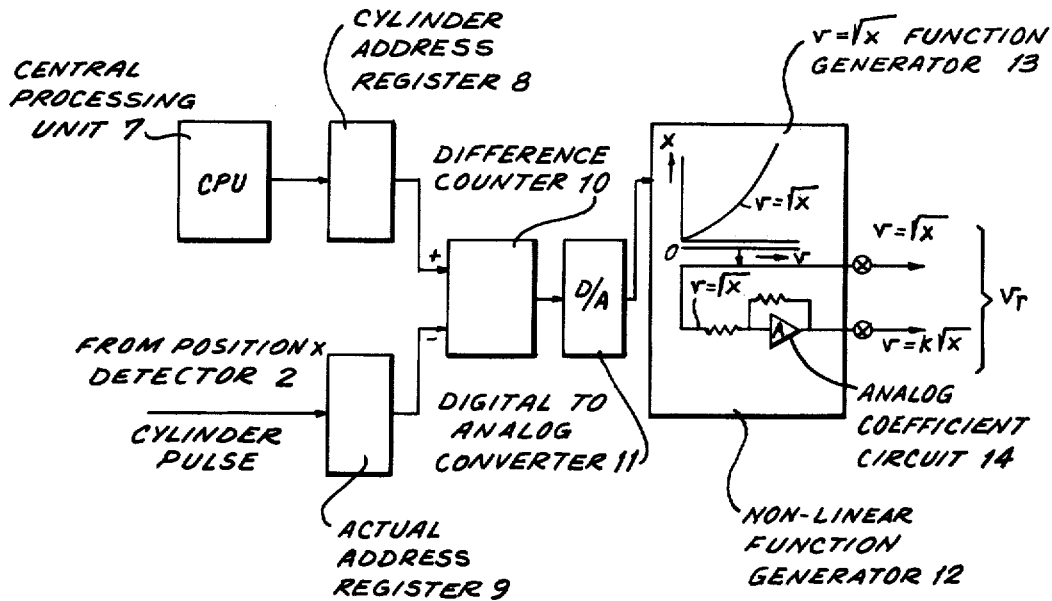
FIG. 6 is a block diagram of an embodiment of the function generator of the voice coil motor control system of FIG. 5.

FIG. 6 discloses the function generator 4 of FIG. 5 in greater detail. In FIG. 6, the output of the central processing unit 7 is connected to the input of a cylinder address register 8. The stop position address information of the magnetic head is stored or set in the cylinder address register 8. The output of the cylinder address register 8 is connected to an input of a difference counter 10. The position detector 2 is connected to the input of an actual address register 9, the output of which is connected to another input of the difference counter 10. The acutal position information of the magnetic head is stored or set in the actual address register 9 by cylinder pulses indicating the desired position of the head. The cylinder pulses are provided by the position detector 2.

The difference counter 10 counts the difference between the stored contents of the registers 8 and 9. The output of the difference counter 10 is connected to the input of a digital to analog converter which converts the count value of said counter to an analog value. The output of the digital to analog converter 11 is connected to the input of a non-linear function generator or generating circuit 12. The non-linear function generator 12 includes a function generator 13 which generates the function $v = \sqrt{x}$ and an analog coefficient circuit 14 which multiplies the function provided by the function generating circuit 13 by a coefficient $k$.

The difference between the head stop position address information, stored in the register 8, as provided by the central processing unit 7, and the address information of the actual position of the head, stored in the register 9, is set in the difference counter 10 as binary information. The content of the counter 10 corresponds to the distance which the magnetic head must move to reach the desired position. After the digital to analog conversion, the content of the difference counter 10 is supplied to the function generator 13.

The speed $v$, which is approximately equal to $\sqrt{x}$ and is a reference speed corresponding to the lower curve of FIG. 4A, is thus produced. Therefore, only the analog coefficient circuit 14 is required to produce a reference speed corresponding to the upper curve of FIG. 4A. In other words, the input $\sqrt{x}$ may be converted to $k\sqrt{x}$ by adequate selection of the input resistance and feedback resistance of the operational amplifier. Furthermore, sufficient accuracy of the function $v = k\sqrt{x}$ is obtained with facility, convenience and ease by accuracy of the function generator 13.

A high precision voltage generator is required to produce the constant $a$, in addition to the $v = \sqrt{x}$ function generator 13, in order to provide the highly accurate pair of curves of FIG. 4A. It is very difficult to provide such circuits having sufficient accuracy.

Figure 8:
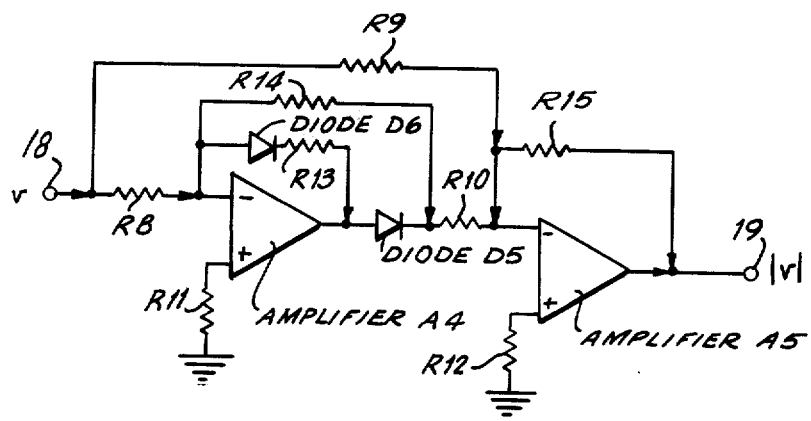
FIG. 8 is a circuit diagram of an embodiment of the absolute value circuit of the speed detector of FIG. 7.
Figure 7:
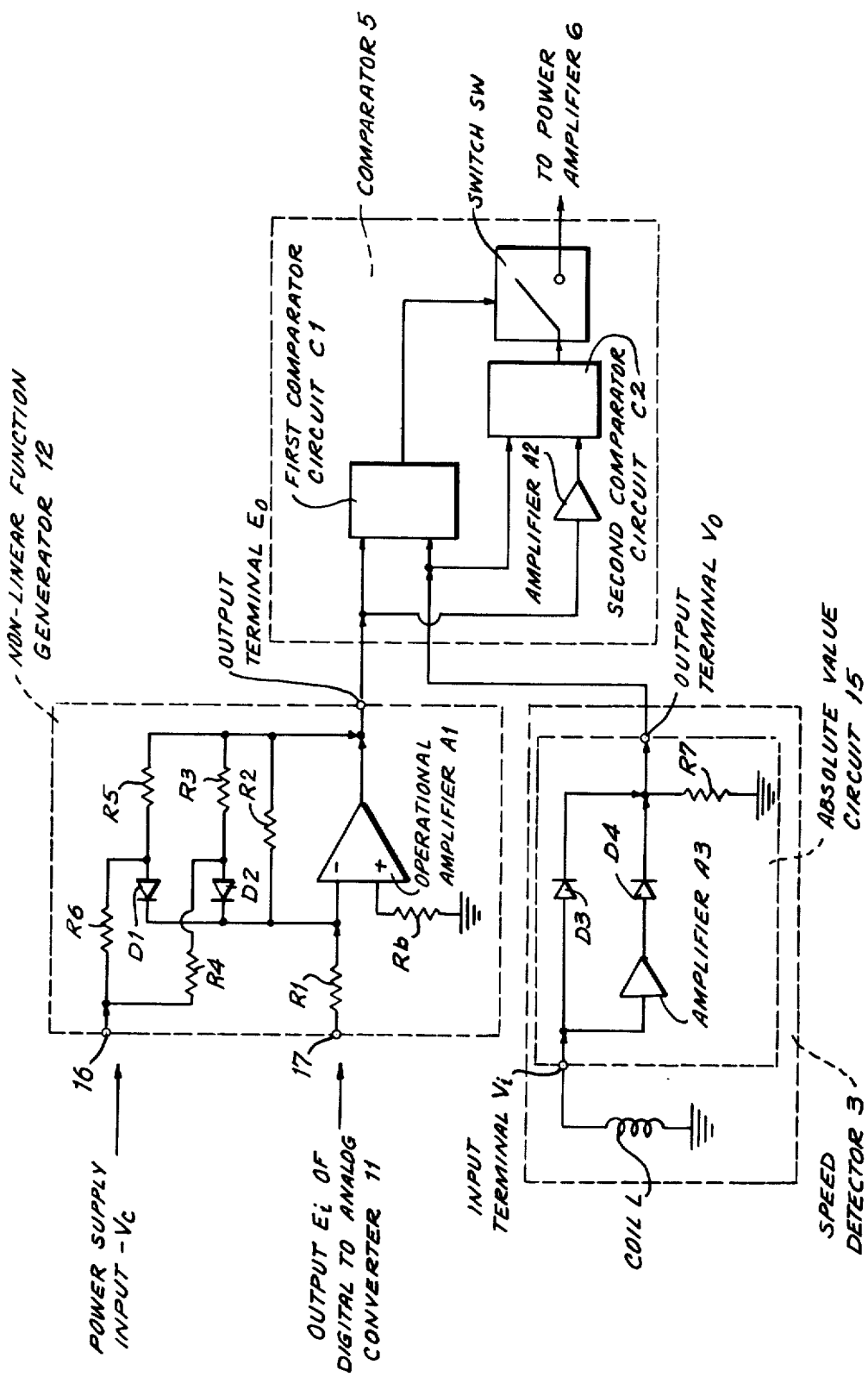
FIG. 7 is a circuit and block diagram of an embodiment of each of the speed detector and the function generator comparator of FIG. 5 and an embodiment of the non-linear function generator of FIG. 6.

The non-linear function generator 12 and comparator 5 are described in greater detail with reference to FIGS. 7 and 8. FIG. 7 shows the speed detector 3 and the comparator 5 of FIG. 5 in greater detail and the non-linear function generator 12 of FIG. 6 in greater detail. FIG. 8 shows an embodiment of the absolute value circuit 15 of the speed detector 3 of FIG. 7.

A power supply input $-V_c$ is applied to an input terminal 16 of the non-linear function generator 12 of FIG. 7. The output signal $E_i$ of the digital to analog converter 11 of FIG. 6 is applied to an input terminal 17. The non-linear function generator 12 comprises an operational amplifier A1. The input terminal 17 is connected to the non-invert input of the operational amplifier A1 via a resistor R1. The non invert input of the operational amplifier A1 is connected to ground via a resistor Rb. The input terminal 16 is connected to the invert input of the operational amplifier A1 in one path via a resistor R4 and a diode D2 and is connected to said invert input in a second path via a resistor R6 and a diode D1. A resistor R2 is connected between the invert input and the output of the operational amplifier A1. The diode D2 connected in series with a resistor R3 are connected in parallel with the resistor R2, as is the diode D1 connected in series with a resistor R5. The non-linear function generator 12 has an output terminal $E_o$ connected to the output of the operational amplifier A1.

A considerably high voltage $E_i$ is applied to the input terminal 17 from the digital to analog converter 11 if the distance of movement is great. Thus, a reasonably high output voltage appears at the output terminal $E_o$. Therefore, the potentials between the resistors R3 and R4, and R5 and R6 across the terminals 16 and $E_o$ become high, making the diodes D1 and D2 conductive As a result, the output $E_o$ is expressed in Equation (3).

$$E_o = E_i \frac{1}{\frac{1}{R2} + \frac{1}{R3} + \frac{1}{R5}}{R1} \quad (3)$$

In Equation (3), the internal resistances $r1$ and $r2$ of the diodes D1 and D2 are neglected for simplification.

When the distance of movement gradually becomes short, the input voltage $E_i$ decreases. As a result, the diode D1 is cut off while the D2 is conductive. Therefore, the output $E_o$ is expressed in Equation (4).

$$E_o = E_i \frac{\frac{1}{\frac{1}{R2} + \frac{1}{R3}}}{R1} \quad (4)$$

When the distance of movement is further shortened, the input $E_i$ decreases proportionately, resulting in the cut off of the diode D2 as well as the diode D1. The output $E_o$ is thus expressed in Equation (5).

$$E_o = E_i \frac{R2}{R1} \quad (5)$$

As hereinbefore described, the output $E_o$ varies as indicated in Equations (3), (4) and (5) in accordance with the input $E_i$. Thus, a curve approximating the function $x$ may be provided.

In the speed detector 3 of FIG. 7, the coil L of the transducer is connected to the input of an amplifier A3 via an input terminal Vi. The output of the amplifier A3 is connected to an output terminal $V_o$ via a diode D4. A diode D3 is connected across the series connection of the amplifier A3 and the diode D4 and is connected between the input terminal $V_i$ and the output terminal $V_o$ and is connected to a point at ground potential via a resistor R7. The circuit, with the exception of the coil L, comprises an absolute value circuit 15.

When the permanent magnet of the transducer moves in the coil L in accordance with the movement of head, a voltage proportional to the speed is induced in said coil. The induced voltage is therefore proportional to the input $V_i$. In order to utilize this phenomenon, a permanent magnet is provided so as to operate in conjunction with the voice coil and a voltage is therefore induced in the coil in accordance with the movement of the voice coil motor. The induced voltage becomes positive or negative depending upon the relative direction of movement between the coil L and the permanent magnet.

Because of the cost of manufacture, it is economically unfeasible to provide a non-linear function generator and a comparator for each of the positive and negative signals. The absolute value circuit 15 is thus provided. The absolute value circuit 15 provides the relation $$V_o = |V_i|$$

between the input $V_i$ and the output $V_o$.

In the absolute value circuit 15, when a negative voltage appears as the input $V_i$, it becomes positive at the amplifier A3, making the diode D4 conductive, and it is again made positive by the resistor R7 as the output voltage $V_o$. When a positive voltage appears as the input $V_i$, the diode D3 becomes conductive and a positive output voltage $V_o$ appears due to the resistor R7. The absolute value circuit 15 is used as shown in FIG. 7, and when greater accuracy of the absolute value is required, it is provided by the absolute value circuit of FIG. 8.

In FIG. 8, an input terminal 18 is connected to the invert input of a first amplifier A4 via a resistor R8 and to the invert input of a second amplifier A5 via a resistor R9. The output of the amplifier A4 is connected to the invert input of the amplifier A5 via a diode D5 and a resistor R10 connected in series therewith. The non-invert input of the amplifier A4 is connected to a point at ground potential via a resistor R11. The non-invert input of the amplifier A5 is connected to a point at ground potential via a resistor R12. The output of the amplifier A5 is connected to an output terminal 19.

A diode D6 and a resistor R13 connected in series therewith are connected between the invert input and the output of the amplifier A4. A resistor R14 is connected between the invert input of the amplifier A4 and a common point in the connection between the diode D5 and the resistor R10. A resistor R15 is connected between the invert input and the output of the amplifier A5.

The comparator 5 of FIG. 7 compares the output $E_o$ of the non-linear function generator 12 and the output $V_o$ of the speed detector 3. The output $E_o$ of the non-linear function generator 12 and the output $V_o$ of the speed detector 3 are connected to the inputs of a first comparator circuit C1 and to the inputs of a second comparator circuit C2 via an amplifier A2 which has an amplification gain of K and directly, respectively. A switch SW has an input connected to the output of the first comparator circuit C1, an input connected to the output of the second comparator circuit C2 and an output connected to the power amplifier 6 of FIG. 5.

When the output voltage $V_o$ becomes larger than the output voltage $E_o$, the first comparator C1 places the switch SW in operating condition. The switch SW controls the switching transistors Q1 to Q4 of FIG. 2B in a predetermined manner. In other words, if current is supplied to the voice coil by the switching transistors Q1 and Q2, these transistors are turned OFF, and if current is supplied by the transistors Q3 and Q4, such transistors are turned OFF.

When a signal is received by the switch SW from the first comparator circuit C1, the switch is operated and supplies a signal from the second comparator circuit C2 to the power amplifier 6. The output of the second comparator circuit C2 is provided by comparing the output $V_o$ and the output $E_o$ multiplied by $k$ by the amplifier A2.

The output of the circuits 12, 3 and 5 is applied to the voice coil motor 1 via the power amplifier 6 as hereinbefore described.

As hereinbefore described, the switching time of the switching element is provided easily and is provided as a whole, and as a result, the access time is made short by the voice coil motor control system of the invention. Furthermore, only by making the accuracy of the $v = \sqrt{x}$ function generator 13 sufficiently high, may a highly accurate $v = k\sqrt{x}$ function be obtained automatically and the recording density of the magnetic disc pack unit be improved.

Although the functions, $v = \sqrt{x}$ and $v = k\sqrt{x}$ are used as the two functions in the described embodiment, the invention is naturally not restricted to such functions only. Any desired suitable function may be used.

While the invention has been described by means of a specific example and in a specific embodiment, I do not wish to be limited thereto, for obvious modifications will occur to those skilled in the art without departing from the spirit and scope of the invention.

I claim:

1. A voice coil motor control system for controlling a voice coil motor for moving an object, the voice coil motor control system comprising distance means for providing an output signal in accordance with the distance between the actual position of the object and the desired position of the object;

lower curve means for providing a speed signal for the motor indicating the stop point of acceleration in accordance with a lower curve function of the difference means;

upper curve means for providing a speed signal for the motor to follow in accordance with an upper curve function in proportional relation with the lower curve function of the lower curve means; and control means for varying the control period of the motor between the lower curve function and the upper curve function in accordance with the output signal of the distance means.

2. A voice coil motor control system as claimed in claim 1, further comprising comparator means connected between the lower curve means and the upper curve means and the motor for comparing the speed of movement of the motor with the speed signal related to the upper curve function and the speed signal related to the lower curve function and controlling the operation of the motor in accordance with the results of the comparison.

3. A voice coil motor control system as claimed in claim 2, further comprising absolute value circuit means connected between the motor and the comparator means for providing the absolute value of the speed of movement of the motor to the comparator means.

* * * * *